July 16, 1946.  H. G. ROGERS  2,404,314
MOLDING APPARATUS
Filed May 25, 1943

Howard G. Rogers
INVENTOR.

BY Donald L. Brown
ATTORNEY

Patented July 16, 1946

2,404,314

UNITED STATES PATENT OFFICE 2,404,314

MOLDING APPARATUS

Howard G. Rogers, Wellesley Hills, Mass., assignor to Polaroid Corporation, Cambridge, Mass., a corporation of Delaware Application May 25, 1943, Serial No. 488,375

5 Claims. (Cl. 18—39)

This invention relates to apparatus for molding accurately surfaced and/or shaped members, such as optical elements, from organic plastics and resins.

One object of the present invention is to provide a novel mold apparatus for accurately forming optical elements, such as optical lenses, from moldable materials which are subject to an appreciable shrinkage during hardening.

Another object of the invention is to provide a mold apparatus of the above character which is particularly adapted for forming optical elements from plastics such as styrene, cyclohexyl methacrylate, or methyl methacrylate.

A further object is to provide molding apparatus of the above type wherein there is embodied means for accurately adjusting the mold parts prior to the introduction therein of the moldable material.

Still another object is to provide apparatus for molding rigid elements having a high degree of accuracy and surface smoothness from polymerizable materials, said apparatus embodying a novel means for operatively assembling the mold parts.

The above and other objects and novel features of this invention will more fully appear from the following detailed description when the same is read in connection with the accompanying drawing. It is to be expressly understood, however, that the drawing is for the purposes of illustration only and is not intended as a definition of the limits of the invention, reference being primarily had for this latter purpose to the appended claims.

In the drawing, wherein like reference characters refer to like parts throughout the several views.

The formation of accurate elements, such as lenses, from organic resins and plastics has required the provision of methods and apparatus whereby suitable compensation is made for the shrinkage which takes place when polymerization of a plastic is advanced through the hardening stage. It has been proposed to provide a mold comprising a plurality of members whereinone of the members is movably mounted and is permitted to move freely during the hardening of the moldable material to compensate for the shrinkage. According to the present invention novel mold means of this type are provided which include means for accurately pre-setting the initial position of the mold parts.

Figure 1:
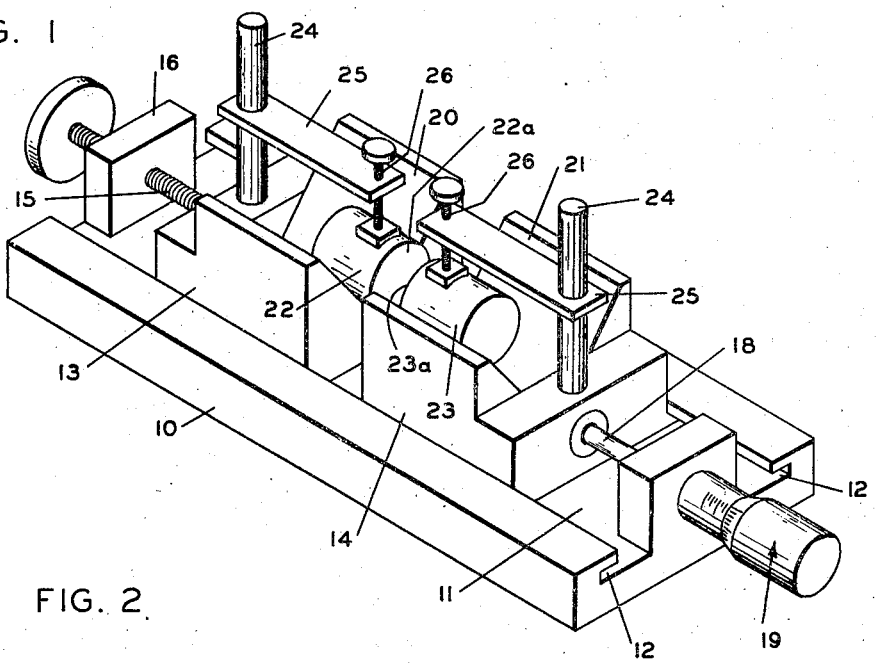
Figure 1 is a perspective view of one type of apparatus embodying the invention.

Referring to Fig. 1, there is shown a base member 10 having a central recess 11 and a pair of longitudinally extending parallel grooves 12 opening into said recess, said recess and said grooves being adapted to receive and guide a pair of mold supports 13 and 14 in longitudinal movement. The latter are slidably supported by the bottom wall of said recess and are provided with suitable flanges which are in dove-tail relation with said grooves, thereby constraining said supports to the desired movement. For adjusting the relative position of support 13, a screw member 15, which has one end journalled for free rotation in said support and is fixed against axial movement relative thereto, is threaded into a bracket 16 which is rigidly secured to member 10.

To accurately predetermine the longitudinal or axial separation of support 14 relative to support 13 after the latter has been fixed, a rod 18 is axially fixed at one end in support 14 for free rotary movement. The other end of said rod constitutes or is secured to the axially movable element of a micrometer 19, or other device for accurately measuring the linear displacement of the rod.

Supports 13 and 14 are provided with V-shaped grooves 20 and 21, respectively, which are adapted to slidably mount a pair of cylindrical mold members, 22 and 23 respectively, the latter being coaxially aligned by said grooves. Each of members 22 and 23 is sufficiently long to provide a good bearing surface for engagement with the walls of said grooves. Adjoining ends or faces 22a and 23a of said members serve to define the light-transmitting surfaces of the optical element being cast which, in the present embodiment, is a double concave lens.

For the purpose of fixing members 22 and 23 relative to supports 20 and 21 respectively, each of said supports is provided with a suitable holding mechanism comprising a rod 24 fixedly mounted on said support and operatively engaged by an arm 25 which has the free end thereof supporting a screw clamp 26. Arm 25 is adapted to be in locking engagement with rod 24 when held inclined thereto. Accordingly, when clamp 26 is axially displaced, i. e., when screwed into locking engagement with the mold member held thereby, arm 25 is simultaneously inclined into locking engagement with rod 24. The release of clamp 26 releases said arm for movement relative to said rod.

Figure 2:
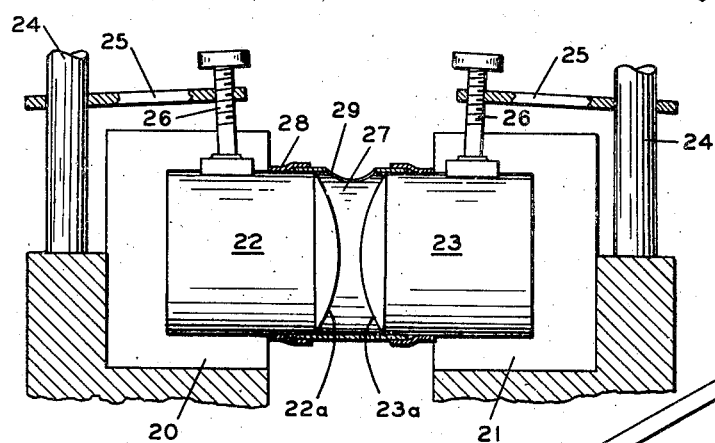
Fig. 2 is a sectional view with parts broken away illustrating the method of assembling the mold prior to the introduction therein of the moldable material.

In operation, support 13 is adjusted by screw 15 to a suitable central position relative to member 10. Mold 22 is rigidly fixed in groove 20 of said support by clamp 26 so that a marginal portion of said element extends beyond the face of said support (Fig. 2). Thereafter support 14 with element 23 clamped therein in a similar manner is moved in the direction of support 13 until surface 23a is in contact with surface 22a. Element 23 is then separated by micrometer 19 from element 22 by a distance equal to the desired thickness of the molded product plus the necessary allowance for shrinkage during molding. This separation can be accurately measured by said micrometer.

Figure 3:
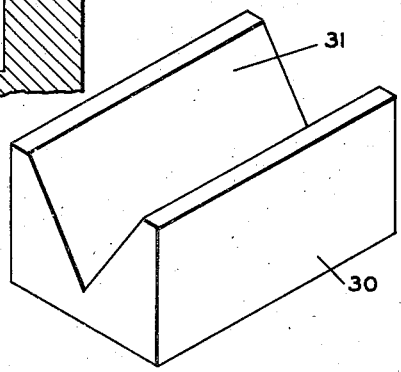
Fig. 3 is a perspective view of a device for operatively mounting the mold parts during the molding.

For confining the moldable material between surfaces 22a and 23a, a sheet of deformable material 27, such as polyvinyl alcohol, is wrapped around the marginal portions of said mold members and is secured thereto. It has been found to be satisfactory to adhesively secure sheet 27 by coating the mold surfaces to be engaged thereby with a dilute polyvinyl alcohol solution prior to the application of said sheet. In order to obviate any leakage due to the wrinkling of the edges of sheet 27, it is desirable to overlap the edge portion of said sheet with a suitable adhesive tape 28, such as Scotch tape. In order to provide for the admission of moldable material into the mold chamber thus formed, a recess 29 is provided, for example, by cutting away a part of pellicle 27. Clamps 26 are then released to free mold elements 22 and 23 and the latter together with diaphragm 27 are removed as a unit to a member 30 (Fig. 3) and positioned in a V-shaped groove 31 in said member, care being taken not to change the axial separation or the co-axial relation between said elements. This removal can be satisfactorily accomplished manually if both mold members are gripped and raised together. Pellicle 27 with tape 28 provide a sufficiently rigid connection between the mold members to make possible the transfer without unusual precautions.

The mold chamber or cavity defined by surfaces 22a and 23a and sheet 27 is thereafter filled with the moldable material, as for example, a partially polymerized solution of styrene or cyclohexyl methacrylate. The mold and the contents thereof may then be subjected to heat in order to advance the polymerization of the moldable solution contained therein and as the solution hardens and shrinks, elements 22 and 23 are drawn together by the adhesion between surfaces 22a and 23a and the hardened product, thereby compensating for the shrinkage and obviating the undesirable effects thereof. Because of the accurate separation of mold surfaces 22a and 23a which includes an allowance for the shrinkage, the length of the molded product along its optical axis is accurately predetermined.

The above molding operation may be carried out with mold members 22 and 23 freely mounted for slidable movement in grooves 20 and 21, respectively. However, it is preferable to use the pre-setting mechanism 10, 13, 14 only for operatively assembling the mold parts and to carry out the actual molding in the more simple member 30.

It is to be understood that a suitable gauge may be used to predetermine the separation between the mold surfaces instead of, or in conjunction with, micrometer 19, particularly when a product having at least one convex surface is to be molded. In the latter event, it is desirable to use a flat gauge which can be withdrawn edgewise from between the mold surfaces after the separation of the mold members is properly adjusted. It is also to be understood that the separation of surfaces 22a and 23a may be effected by employing a suitable jig, said jig having stops which bear against the ends of the mold members to determine their separated positions.

There is thus provided a novel apparatus embodying novel means for positioning and adjusting mold parts so that the latter can be readily and accurately assembled in operative relation to each other. The apparatus comprises means for slidably supporting the mold members, said means being in turn slidably and adjustably supported so that accurate adjustment of the mold members can be readily effected before the latter are freed for movement during hardening.

Although only a single embodiment of the invention has been illustrated and described, it is to be expressly understood that the same is not limited thereto. For example, it will now be apparent to those skilled in the art that other clamping devices of a conventional nature may be employed in lieu of the clamping arrangement illustrated for holding the mold members in the supports therefor. It is also to be understood that a suitable gauge may be pivotally mounted on base 10 so that it can be pivoted into an operative position to fix the positions of the mold members. Moreover, support 13 may be rigidly secured to base member 10 instead of being slidably mounted relative thereto.

Since certain changes in the constructions set forth which embody the invention may be made without departing from its scope, it is intended that all matter contained in the above description, or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In apparatus of the character described, a plurality of cylindrical mold elements, a plurality of supports having grooves for receiving said mold elements and maintaining the latter in coaxial alignment, said mold elements being free for sliding movement relative to said supports and for ready removal as a unit from said supports, holding means carried by each of said supports for releasably securing the mold elements to said supports, means for mounting said supports for sliding coaxial movement relative to one another, and means comprising a micrometer mechanically associated with said last named mounting means and one of said supports for adjusting and measuring accurately the separation between the faces of the mold elements carried by said supports.

2. In a device of the character described, a plurality of mold elements, a plurality of supports providing a plurality of aligned grooves the adjacent ends of which are open and adapted to receive and slidably mount said mold elements, the side walls of said grooves maintaining the mold elements in coaxial alignment, means operative to releasably secure said mold elements to said supports, said securing means comprising mold-holding elements adjacent the open ends of each groove for holding said mold elements in operative engagement with said groove walls and against axial movement within said grooves, said mold-holding elements being movable to inoperative position to permit removal of said mold elements as a unit from said supports, means for mounting said supports for coaxial movement relative to each other, and means cooperating with said last-named mounting means and said supports for adjusting accurately the separation between the faces of the mold elements carried by said supports.

3. In a device of the character described, a plurality of mold elements, a plurality of supports providing a plurality of aligned grooves the adjacent ends of which are open and adapted to receive and slidably mount said mold elements, the walls of said grooves maintaining the mold elements in coaxial alignment, means operative to releasably secure said mold elements to said supports, said securing means comprising mold-holding elements adjacent the open ends of each of said grooves for holding said mold elements in operative engagement with said groove walls and against axial movement within said grooves, said mold-holding elements being movable to inoperative position to permit removal of said mold elements from said support, means for mounting said supports for coaxial movement relative to one another, and means comprising a micrometer mechanically associated with said supports for adjusting accurately the separation between the faces of the mold elements carried by said supports.

4. In a device of the character described, a pair of mold elements, a pair of supports each providing a groove, said grooves being aligned and having the adjacent ends thereof open and adapted to receive and slidably mount one of said elements, the walls of said grooves maintaining said mold elements in coaxial alignment, means operative to releasably secure said mold elements to said supports, said securing means comprising a pivoted mold-holding element adjacent the open ends of each groove and holding each said mold element against axial movement within said grooves, said mold-holding elements being pivoted to inoperative position to permit removal of said mold elements as a unit from said supports, means for slidably mounting both of said supports for coaxial movement relative to one another, and means cooperating with said last-named mounting means and said supports for adjusting accurately the separation between the faces of the mold elements carried by said supports.

5. In a device of the character described, a plurality of mold elements, a plurality of supports providing a plurality of aligned grooves the adjacent ends of which are open and adapted to receive and slidably mount said mold elements, the walls of said grooves maintaining the mold elements in coaxial alignment, means carried by said supports and operative to releasably secure said mold elements to said supports, said securing means comprising a pivoted mold-holding element adjacent the open ends of each groove for holding said mold elements against axial movement within said grooves, said mold-holding elements being pivoted to inoperative position to permit removal of said mold elements as a unit from said supports, means for mounting said supports for coaxial movement relative to one another, and means cooperating with said last-named mounting means and said supports for adjusting accurately the separation between the faces of the mold elements carried by said supports.

HOWARD G. ROGERS.